United States Patent
Vaz (10) Patent No.: US 9,534,581 B2
(45) Date of Patent: Jan. 3, 2017

(54) VERTICAL AXIS TURBINE

(71) Applicant: Guy Andrew Vaz, Singapore (SG)

(72) Inventor: Guy Andrew Vaz, Singapore (SG)

( * ) Notice: Subject to any disclaimer, the term of this patent is extended or adjusted under 35 U.S.C. 154(b) by 535 days.

(21) Appl. No.: 13/946,165

(22) Filed: Jul. 19, 2013

(65) Prior Publication Data

US 2013/0309062 A1 Nov. 21, 2013

Related U.S. Application Data (62) Division of application No. 13/810,782, filed as application No. PCT/SG2010/000314 on Aug. 26, 2010, now Pat. No. 8,511,965.

(51) Int. Cl.
   *F03D 3/06* (2006.01)
   *F03D 3/04* (2006.01)
   *F03D 9/00* (2016.01)

(52) U.S. Cl.
   CPC ........... *F03D 3/0418* (2013.01); *F03D 3/0409* (2013.01); *F03D 3/061* (2013.01); *F03D 9/002* (2013.01); *F05B 2240/132* (2013.01); *Y02B 10/30* (2013.01); *Y02E 10/74* (2013.01); *Y10S 415/907* (2013.01)

(58) Field of Classification Search
   CPC ...... F03D 3/0409; F03D 3/0418; F03D 3/061; F03D 9/002; F05B 2240/135; Y02B 10/30; Y02B 10/74
   See application file for complete search history.

(56) References Cited

U.S. PATENT DOCUMENTS

| | | | |
|---|---|---|---|
| 537,494 A | 4/1895 | Stevens | |
| 1,645,855 A | 10/1927 | DeVore | |
| 2,867,283 A * | 1/1959 | Shanahan | 415/150 |
| 3,938,907 A | 2/1976 | Magoveny | |
| 4,031,405 A * | 6/1977 | Asperger | F03D 3/0472 290/44 |
| 4,047,834 A | 9/1977 | Magoveny | |
| 4,142,822 A | 3/1979 | Herbert | |
| 4,236,866 A | 12/1980 | Zapata Martinez | |
| 4,551,631 A | 11/1985 | Trigilio | |
| 4,834,610 A | 5/1989 | Bond | |

(Continued)

FOREIGN PATENT DOCUMENTS

| | | |
|---|---|---|
| DE | 729 533 C | 12/1942 |
| DE | 44 29 376 A1 | 2/1996 |
| DE | 202 17 869 U1 | 4/2004 |
| EP | 1650 432 A1 | 4/2006 |
| FR | 508 815 A | 1/1920 |

(Continued)

OTHER PUBLICATIONS

Application and File History for U.S. Appl. No. 11/810,782, filed Jan. 17, 2013, Inventor: Guy Andrew Vaz.

(Continued)

*Primary Examiner* — Igor Kershteyn (74) *Attorney, Agent, or Firm* — Patterson Thuente Pedersen, P.A.

(57) ABSTRACT

Embodiments related to wind turbines and methods of guiding a flow of a fluid using a wind turbine. In one embodiment, a wind turbine includes a framework including an annular upper guide means and an annular base guide means; and an annular rotor assembly surrounding a central space, the rotor assembly comprising a plurality of rotor vanes, each rotor vane being held in position between the upper guide means and the base guide means.

16 Claims, 8 Drawing Sheets

(56) References Cited

U.S. PATENT DOCUMENTS

| | | | |
|---|---|---|---|
| 5,126,584 A | 6/1992 | Ouellet | |
| 5,380,149 A | 1/1995 | Valsamidis | |
| 6,309,172 B1 | 10/2001 | Gual | |
| 6,327,994 B1* | 12/2001 | Labrador | B01D 61/10 114/382 |
| 6,629,815 B2* | 10/2003 | Lusk | F03D 3/005 415/4.2 |
| 7,329,965 B2 | 2/2008 | Roberts | |
| 7,417,334 B2* | 8/2008 | Uchiyama | F03D 3/02 290/44 |
| 7,816,802 B2 | 10/2010 | Green | |
| 8,164,213 B2* | 4/2012 | Mahaffy | F03D 3/005 290/44 |
| 2003/0030283 A1 | 2/2003 | Lusk | |
| 2007/0241567 A1 | 10/2007 | Platt | |
| 2010/0001525 A1* | 1/2010 | Yang | F03D 3/005 290/44 |
| 2010/0062238 A1* | 3/2010 | Doyle | B29C 70/02 428/295.1 |
| 2010/0143096 A1 | 6/2010 | Carosi | |

FOREIGN PATENT DOCUMENTS

| | | |
|---|---|---|
| FR | 550 046 | 12/1922 |
| GB | 2 033 019 A | 5/1980 |
| GB | 2 049 066 A | 12/1980 |
| GB | 2477824 B | 8/2011 |

OTHER PUBLICATIONS

International Preliminary Report on Patentability, Application No. PCT/SG2010/000314, mailed Feb. 26, 2013, 5 pages.

GUAL StatoEolien, Technical Documentation, 11 pages, as available on Jan. 17, 2013, at http:www.gual-statoeloien.com/Doctechang.pdf.

International Search Report, Application No. PCT/SG2010/000314, 2 pages, mailed May 16, 2011.

Search Report, Application No. GB1015781.6, Date of Search: Nov. 26, 2010, 1 page.

Extended European Search Report, Application Ao. 15182124.6, mailed Dec. 16, 2015, 9 pages.

\* cited by examiner

VERTICAL AXIS TURBINE

RELATED APPLICATION

This application is a division of application Ser. No. 13/810,782 filed Jan. 17, 2013, which in turn is a National Phase entry of PCT Application No. PCT/SG2010/000314, filed Aug. 26, 2010, each of which is hereby fully incorporated herein by reference.

TECHNICAL FIELD

Embodiments relate to apparatus and methods for the generation of power, particularly but not limited to green energy technologies harnessing energy from natural and/or renewable fluid energy sources for conversion into electricity, torque or other useful forms of power, such as wind turbines or generators.

BACKGROUND

Wind energy has used for powering machinery since ancient times. Since then, the need to generate power from greener and renewable sources like the wind has become ever more urgent, and wind turbines have been developed for the production of electrical power. In spite of this, wind power has seldom succeeded in commercial terms, owing to the variability of the supply of wind over time and geography. Typically, wind turbines operating in areas with consistently high wind speeds tend to be the most commercially viable, but such sites are rare.

Different wind turbine designs have been developed for use in different scenarios and applications. For example, they may be classified according to whether the blades of the wind vane rotate about an axis of a shaft which is horizontally or vertically disposed. Horizontal axis wind turbines (HAWTs) tend to be more commonly deployed as they tend to be more efficient: this is a result of blade rotation in a direction perpendicular to the direction of wind flow so that they receive energy through the entire cycle during rotation. However, they suffer various disadvantages, not least in the sheer height, size and weight of the towers and the blades, which makes installation, operation and maintenance extremely costly. They also need careful positioning into the wind, are unlikely to work well in conditions where the wind is variable in speed and direction. Such wind turbines are also potentially disruptive, in the visual sense as well as to anything from wildlife, to the transmissions of radio signals.

Vertical axis wind turbines (VAWTs) are inherently less efficient as the blades receive energy from the wind for only a part of its rotation cycle during which it is "blown" forward. For much of the remaining part of the cycle, the blade rotates in a direction substantially against the direction of wind flow. This can be contrasted with HAWTs, in which the wind energy is captured by the blade throughout its cycle. This will be described in further detail below; suffice it here to say that a large part of the energy captured from the wind is typically lost due to drag when the rotor blade travels into the wind as it goes through its cycle. VAWTs nonetheless have the advantage of being capable of harvesting power from winds of lower and more variable speeds. They tend to be smaller and lighter, and can be deployed at lower heights, resulting in reduced conspicuousness, installation and maintenance costs. This allows them to be used in a greater variety of locations.

With their otherwise advantageous characteristics, attempts have been improve the efficiency of VAWTs. By way of example, US 2007/0241567 describes the use of guides to bias or channel the wind onto the rotor blades, which enhances the turbine's use in a variety of locations regardless of wind direction. A commercially-available VAWT marketed under the name of "StatoEolien" by Gual Industrie of France (http://www.gual-statoeolien.com/English/defaultang.html) includes a similar guide device. Although this helps to increase the effect of the available wind on the rotor blades, the overall efficiency of output remains poor, as the wind energy captured by the blade is later "given up" when the blade backtracks against the wind during the later stage in its cycle. As may be expected, this is a factor seriously affecting the efficiency of the turbine in the generation of electrical power, especially in low wind velocity areas where VAWTs are deployed, where any such loss is especially keenly felt.

It would be desirable to improve the efficiency of wind turbines, especially VAWTs.

SUMMARY

An embodiment relates to a guiding apparatus for guiding a flow of a fluid for use with a rotor, the rotor comprising an annular radial vane assembly having a plurality of vanes surrounding a central space sandwiched between covers, the rotor being arranged to rotate about a vertical axis, the guiding apparatus comprising a screening arranged to define in the central space a plurality of zones including a fluid intake zone for entry of the fluid into the central space, a fluid exhaust zone for exit of the fluid from the central space, and fluid retention zones for discouraging the fluid from leaving the central space, wherein in use the fluid is guided by the screening to substantially circulate about the vertical axis within the central space in the same direction as rotor travel.

By managing not only the entry of an airflow into the turbine, but also its movement within, and its exit from, the turbine, the level of turbulence and drag generated can be reduced within a VAWT, especially in the zones away from the immediate high pressure impact of the oncoming wind. Causing the airflow to circulate in the same direction as the rotor movement, by guiding it through different zones of the central space within a radial rotor arrangement helps reduce the levels of drag which generate a back force against the desired rotor direction. In further embodiments, the airflow is guided out of the rotor and turbine in a manner which pushes on the vanes of the rotor, resulting in the harvesting of the energy from the wind twice: once on the windward side (as the air flows into the turbine) as well as when the air exits the turbine.

In another embodiment, a wind turbine system comprises a rotor comprising an annular radial vane assembly surrounding a central space, and arranged to rotate about a vertical axis, operatively connected to a guiding apparatus.

In another embodiment, a method of guiding a flow of a fluid for use with a rotor, the rotor comprising an annular radial vane assembly surrounding a central space sandwiched between covers, the rotor being arranged to rotate about a vertical axis, comprises using a screening to define in the central space a plurality of zones including a fluid intake zone for entry of the fluid into the central space, a fluid exhaust zone for exit of the fluid from the central space, and fluid retention zones for discouraging the fluid from leaving the central space, and using the screening to guide the fluid to substantially circulate about the vertical axis within the central space in the same direction as rotor travel.

BRIEF DESCRIPTION OF THE DRAWINGS

Embodiments of the invention will now be described, by way of example only, with reference to the accompanying drawings, in which.

DETAILED DESCRIPTION

Figure 1:
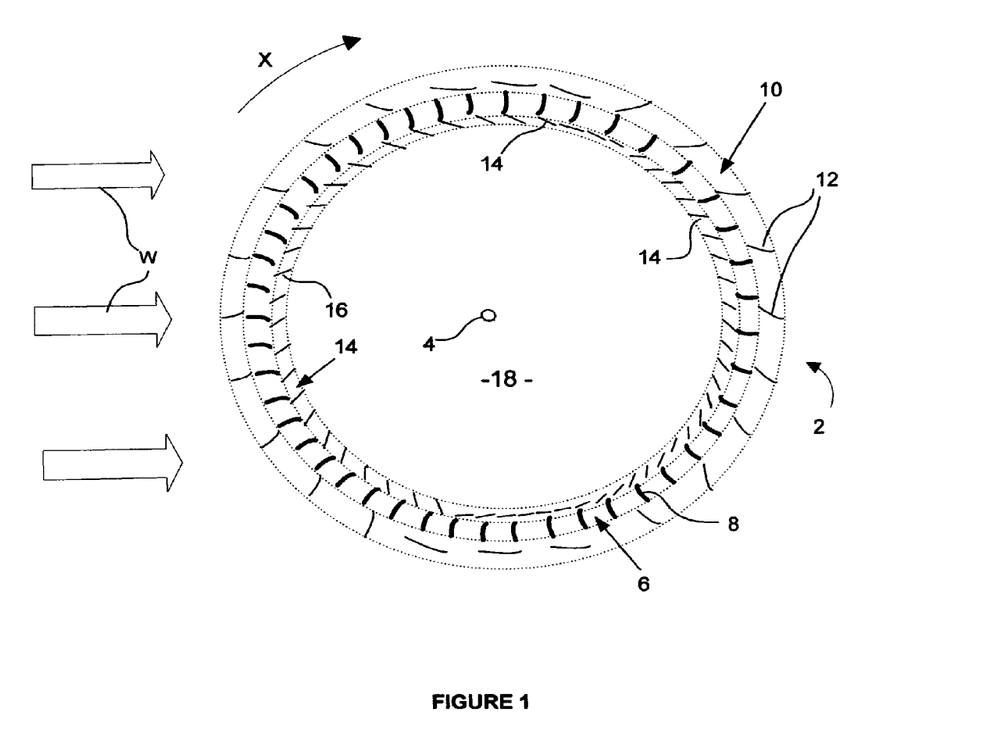
FIG. 1 is a schematic plan view of an embodiment of a wind turbine according to an embodiment.

FIG. 1 is a top view of a vertical axis wind turbine (2), which is arranged to rotate about a vertical axis (4) for use in harnessing of wind (W) energy to generate usable torque, including electrical power. As the skilled person would appreciate, the term "vertical axis wind turbine" (VAWT) serves primarily to distinguish this type of turbine from a horizontal axis turbine. The axis about which the turbine rotates need not be precisely vertical, as long as the turbine blades or vanes are caused to rotate in a substantially horizontal direction during use. As noted above, VAWTs are capable of operation in lower velocity winds, and it is anticipated that the turbine of the invention can produce useful results with wind velocities as low as 5 km/h.

As can be seen in the drawings, the turbine includes three ring arrays of blades or vanes surrounding a central section or space (18). The ring arrays are substantially concentric with each other and with a central axis (4).

The outer ring (10) and the inner ring (14) are air guide assemblies in the form of stators, which direct and control air flow towards, into, through, and out of the rotor assembly (6).

Figure 3A:
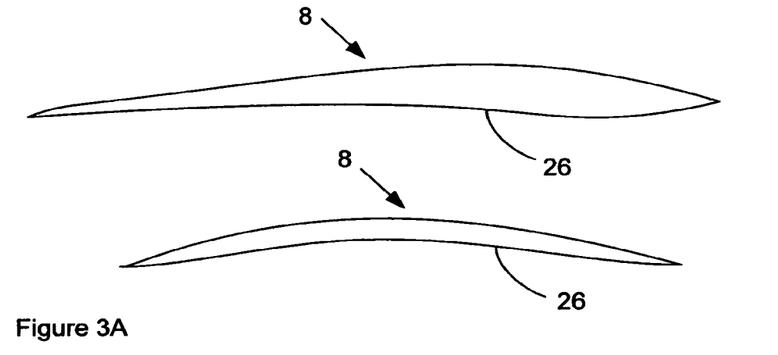
FIGS. 3A, 3B and 3C are schematic views of the rotor vanes and guide slats used in an embodiment of the wind turbine.

The annular rotor assembly is the middle of the three rings. As is well known, rotor movement caused by the pushing force of a fluid flow on its vanes produces torque which can be used to drive e.g. a generator (not shown), to work pumps, grinding wheels, or the like. In the embodiment shown, the rotor is made up of a plurality of vanes (8) which each extend substantially radially outwards from the axis (4). The rotor vanes are positioned vertically within the turbine, and in plan view, each are angled so as to be slightly offset from the true radial of the axis. The vanes can alternatively comprise straight blades arranged in a true radial configuration, but preferably they are asymmetric airfoils e.g. of the types shown in FIG. 3A. The vanes comprise a concave surface on the windward side (26) which allows the wind to be initially "caught" and then to flow off the curved surface, for increased efficiency in extracting energy out of the available wind. As is known, during use the combination of the pushing effect on the higher pressure windward side together with the suction effect caused by the lower pressure the leeward side causes the vane to move and generates lift.

In an exemplary embodiment, an asymmetric rotor 18 m long (or tall, when put into position within the turbine) has a chord of about 1.2 m (viewed above), and a maximum thickness of 0.2 m in the middle section which thickness reduces gradually towards each end. The exact optimal profile of the vanes is dependent on the overall size and configuration of the turbine the rest of the components, which is in turn determined for each turbine based on the specifics of each site and the desired performance and output.

Figure 2:
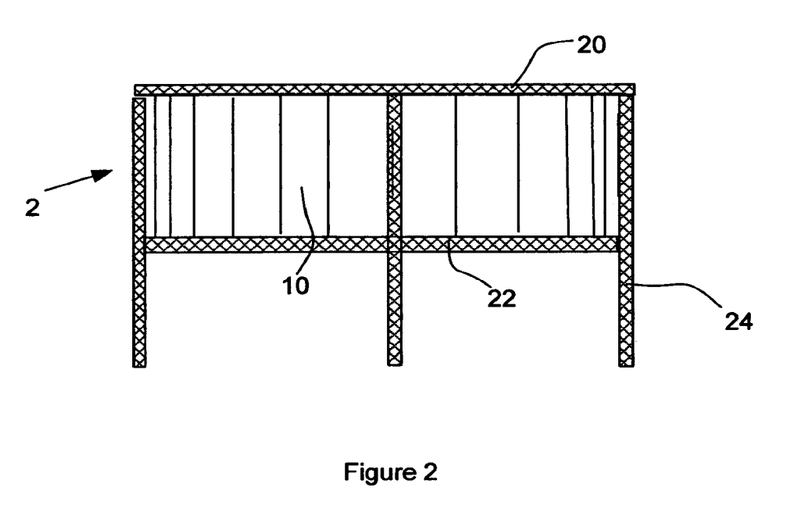
FIG. 2 is a side view of the wind turbine of FIG. 1.

FIG. 2 shows a side view of the turbine (of which only the outer guide assembly (10) is visible), which is held within a framework such as a space frame comprising an upper support (20), a base support (22), and optional columns (24) to raise the unit into the path of the wind where necessary. Further views of the turbine held within the space frame can be seen in FIGS. 8A and 8B, where it can be seen that the section of the framework accommodating the turbine component has a drum-like structure. The space frame can be made from reinforced concrete and steel, and in the exemplary embodiment appropriate to accommodate rotors of the size referred to above, the space frame may have an overall diameter of about 35 m across, and a height of about 20 m.

The rotor vanes held in position at each end between a pair of annular brackets or guide rails which are respectively attached to the upper and base supports of the space frame. The guide rails prevent the vanes from slipping out of position during movement. The vanes themselves can all be attached to annular tracks at each end, which during use travel within the corresponding brackets, which ensures that all the vanes rotate as a single unit. In an implementation of the size discussed above however, it would be difficult to manufacture, transport and to install the rotors in a single assembly. In such cases, one or more rotor vanes can be provided with a section of track which during installation can be bolted together. The skilled person would appreciate that a variety of alternatives are available for the location of the rotor vanes within the turbine. For example, the rotor vanes can all be fixed at each end to plates which rotate about the axis, which obviate the need for guide rails or tracks. To reduce the weight and inertia of the rotor assembly, the vanes may be constructed with a foam core and an epoxy composite matrix outer covering, which may be carbon-reinforced.

The rotor vanes have generally fixed positions within the rotor assembly, although they can optionally and preferably be provided with a teetering hub assembly, which will enable it to assume a reduced pitch in the event of destructively high winds to prevent or reduce damage to the vane. The position of each rotor vane is fixed relative to each other, although the distance between vanes and the dimensions of each vane may vary in dependence on the desired performance and output of the turbine.

The turbine further and preferably includes a synchronizer for improved performance. It was found that the rotor vanes may rotate at different speeds at each end. This is due at least in part to the fact that the lower section of the rotors are operatively coupled to gearing to drive a generator, while the upper sections carried no load. As might be anticipated, the rotors will suffer from strain during use from and may at an extreme, warp or break. The synchronizer can take a variety of forms, but one solution would be to place a similar load at the top end of the vanes, e.g. in the form of identical gearing, which will lockstep the rotational speeds of both ends of the rotor vanes.

Turning now to the guide assembly arrays, the blade or vanes of the outer (10) and inner (14) guide assemblies are referred to in this description as slats or screening (respectively, 12 and 16), to ease their description and to distinguish them from the vanes (8) of the rotor assembly. In the embodiment discussed here, the slats are louvered so that when they assume a "closed" position, the edges of the slats either almost or actually touch or overlap so that to prevent or at least discourage air from passing through. The guide assemblies' primary purpose is to enable the rotor maximise extraction of usable energy from a given volume of airflow, while seeking to significantly reduce the amount of friction and drag caused when the airflow is vented from the closed central space and through the rotor vanes. Even though the desired effect is in part obtained by each guide assembly separately, the operations of the two sets of assemblies augment each other so that an optimal set up would involve the use of both assemblies working in cooperation with each other.

As can be seen in the drawing, the slats of the guide assemblies (10 and 14) are arranged so that certain parts of the rotor assembly are open to its surroundings, while other sections are slatted shut, substantially screening the rotor vanes (and the central space within) from their surroundings outside the turbine.

During operation, the arrangement of the slats for both inner and outer guide stators remain unchanged for a given wind direction. To accommodate a different wind direction, the slats of each guide arrays can be re-angled to assume the same configuration pointing into the new wind direction. Alternatively, the guide ring arrays (preserving the slat configuration shown in the drawings and as discussed below) can be manually rotated relative to the rotor assembly to its new position, or else the entire turbine can be turned around, if feasible, e.g. in a smaller turbine. Given the proposed size of the turbine however, the guide assembly re-configuration process can be motorized to obtain the slat configuration relative to the new wind direction, but the slats of smaller rotor vanes could be adjusted by hand. Changes to the slat positions within the assemblies can be made manually, or else a sensing system could be used to automatically respond to changes in wind directions, velocities and the like which would require a reconfiguration in the guide slat angles.

Figure 3B:
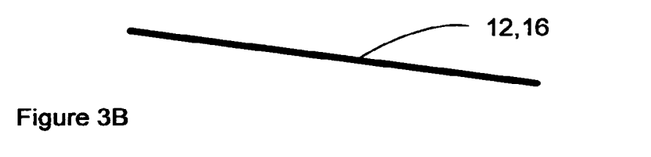
Figure 3C:
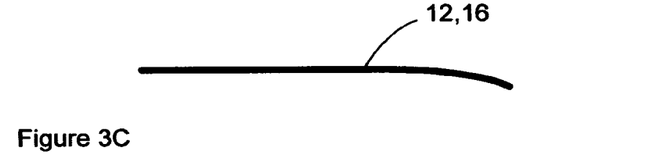

The outer guide assembly (10) serves primarily to shape the air flowing towards and into the turbine by controlling the intake of air into the turbine, and to enable the exhaustion of air from the turbine with reduced turbulence on the other, by controlling the exhaustion of air from the turbine. In this embodiment, the slats of the outer guide can comprise a straight or a curved stator as shown respectively in FIGS. 3B and 3C. It is relatively thin to cause minimal obstruction to the wind, and so are preferably made to be as thin, smooth and short a surface as possible. They are disposed very near to the trailing edge of the rotor vanes (e.g. in the order of millimeters, where possible), as this improves rotor efficiency. The slats can be made from steel or aluminum. While the slats tend not to be moved during operation of the turbine for a given wind direction, they can nonetheless be made to be movable in embodiments to allow them to be re-configured e.g. to work with a different wind direction. This also allows for control of the amount of air allowed into the turbine, to cope with higher or lower velocities of wind, and in extreme cases (e.g. in a typhoon or a sandstorm which will injure the apparatus, necessitating the shutdown of the turbine), all the slats can be completely closed all around, preventing any air from blowing into the turbine. The use of teetering hub rotor vanes described above would nonetheless be beneficial to protect the expensive rotor vanes in an event of high wind, as they are likely to respond to such otherwise-catastrophic conditions than slat closure of the outer guide assembly.

On the airflow intake aspect, the slats of the outer guide assembly on the windward side of the turbine are therefore arranged so that as much of the air flow is "caught" and directed into the turbine to the rotor blades as is possible by changing the wind direction if necessary, to optimize the airflow's angle of "attack" on the rotor vanes. For example, it can be seen from FIG. 1 that the vanes at the 7 o'clock position are in a fully open position and positioned to "scoop" airflow which otherwise might have travelled around the turbine, into the turbine to "feed" the flow to the rotor vanes and push them along to rotate in a clockwise direction as depicted by the arrow "X". In this way, the effective footprint of the wind harvesting surface of the turbine is significantly enlarged on the windward side of the turbine, to the zone between the 7 and 12 o'clock positions.

On the leeward side of the turbine, the slats are also positioned in an open position. They are angled so that air exiting the turbine is again guided to travel in the direction of rotor movement "X." This ensures that the airflow out of the turbine does not interrupt the continued rotation of the rotor assembly in the clockwise direction and slow its progress. On the two sides of the turbine orthogonal to the wind direction, the outer guide slats are substantially closed or screened off. In the example discussed here, the screening is achieved by closing the slats; it would be within the scope of the invention to provide other screening means e.g. in the form of a single screen extending the length of the section requiring to be closed off—this could be deployed e.g. in a smaller turbine, where the guide ring arrays can be moved relative to the rotor assembly. The effect and working of the overall arrangement of slats in the outer guide arrangement during use will be discussed below in connection with FIG. 4.

The outer guide vane array is, in the exemplary embodiment, attached at each end to the upper and base supports of the space frame.

Turning now to the inner guide assembly (14), these slats (16) are also arranged to create sections or zones which are open or closed to the turbine surroundings. The main function of the inner guide assembly is to guide and control the flow of air within the central space after it enters the turbine, with the aim of reducing the amount of turbulence and drag and frictional losses that adversely affects the turning of the rotor assembly and its overall efficiency.

Like the slats of the outer guide, the inner stator slats also take the form of thin sheets which are cambered along its length in embodiments. They can also have a small chord like the movable leading edge of a wing, allowing for each to be movable independently of each other about its own axis. This flexibility allows for airflow to make contact at an optimal angle with the leading edge of the rotor vanes during operation. The inner slats can be made from metal or a fiberglass epoxy composite material. They are also disposed very near to the trailing edge of the rotor vanes for greater rotor efficiency.

In the main, the slats (16) of the inner assembly are arranged in such a way so that, like the slats of the outer guide assembly, it is open on the windward and leeward sides, while being substantially closed in the other two sections on the sides orthogonal to the direction of wind. The exact angle of each inner guide slat is additionally positioned to encourage the circulation of the airflow in the central space around the turbine axis in the same direction of the rotor travel, as will be described further below in connection with FIG. 4.

The central space (18) defined by the inner guide ring array is substantially but not fully enclosed by covers (not shown, but which can take the form of discs or the like) along the plane transverse to the vertical axis of the turbine. The covers are disposed within the upper and base support structures (20, 22) of the space frame so that they "sandwich" the central space in a manner which nonetheless allows the rotor vanes to freely move. They can also be viewed as the roof and floor of the turbine. In a very large implementation, a pillar or post may be placed through the central axis of the turbine to help hold the roof up; this is however not necessary to the operation.

This arrangement prevents or discourages air from entering into or escaping from the central space in a direction parallel to the vertical axis of the turbine, so that air is constrained to flow to and from the closed central space only in a substantially horizontal direction via the spaces between the rotor vanes and the guide assembly slats (10, 14). The skilled person would realize that the covers need only to cover the central space to achieve the enclosing effect, but that they can also cover the rotor assembly as well as the guide arrays for ease of assembly and maintenance; fuller coverage can also help in preventing air from leaking out of the central space. They can also be made of a lightweight or any other material and take any configuration as long as it is capable of discouraging or preventing air leakage from or entry into, the central space.

Figure 4:
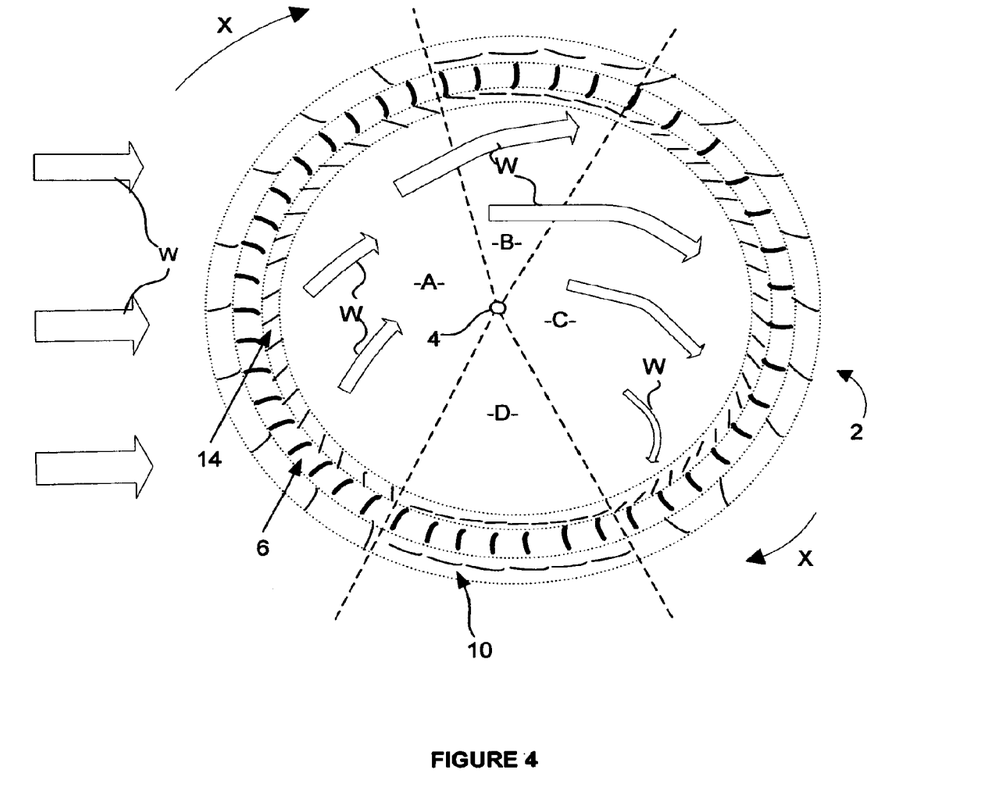
FIG. 4 depicts the operation of the wind turbine according to an embodiment.

FIG. 4 is a depiction of the operation of the embodiment of the turbine shown in FIGS. 1 and 2. In this figure, the central space (18) is shown to be divided into four zones:

- an "intake zone" (zone "A", between the 7 and 12 o'clock positions),
- a first "boundary zone" (zone "B", between the 12 and 2 o'clock positions),
- an "exhaust zone" (zone "C", between the 2 and 5 o'clock positions), and
- a second "boundary zone" (zone "D", between the 5 and 7 o'clock positions).

In the drawings, the wind (W) is shown blowing from left to right, and the desired direction of rotation of the turbine is in a clockwise direction "X." The windward side of the turbine is an area of higher pressure than the leeward side.

In the intake zone "A," wind outside the turbine is "gathered" by the slats (16) of the outer guide assembly (14) and channeled towards the vanes (8) of the rotor (6). Because of the open radial configuration of the outer slats in the intake zone (especially around the 9 o'clock position), wind can flow directly to the vanes of the rotor as shown in detail in FIGS. 4 and 5. In conventional VAWTs without use of the outer guide assembly, it may be expected that the wind will usefully impinge on the rotor vanes only in the region between the 9 and 12 o'clock positions. With use of the outer guide stator however, airflow that might otherwise have flowed around the turbine and be lost, is instead captured and "scooped" (by changing the direction of the flow of air) into the turbine to push the rotor vanes in the desired direction "X". This contributes to an increase in the pushing force on the rotor and to the increased efficiency of the turbine as a whole.

As noted above, most of the usable wind energy in VAWTs is extracted on the windward side where the air flows directly push on the vanes. In a conventional VAWT set up there is no force pushing on the vanes at any other region, so that during the "return journey," the rotor assembly is particularly susceptible to the effects of drag. Where the wind force is greater than drag, a net positive force is obtained which can be used to drive a generator. Where the driving force is equal to or less than drag, no energy can be harnessed. It is therefore important to minimize the effect of drag on the system.

After the air flow had been guided onto the rotor vane, it flows into the central space, as depicted by the arrows "W." In conventional turbines, the exit of air flow from the turbine is not managed, so that turbulence in the form of air eddies builds up within the central space and/or around the rotor vanes. This contributes to the creation of friction and drag within the system which adversely affects the continued rotation of the rotor in the desired direction, especially on the "return journey" of the rotor assembly. Where the drag equals or exceeds the pushing force on the rotor vanes, no useful torque will be produced to turn a generator or do other work.

The inner guide vanes of the invention per the exemplary implementation address this problem by managing the airflows within the central space. Specifically, the air is guided within the central space to circulate (i.e. to travel in a substantially circular, in whole or part, or arcuate, or curved manner) about the central axis of the turbine in the same direction as the desired rotational direction "X" of the rotor vanes. Managing the airflows in this manner reduces the levels of turbulence built up within the central space, and has the added benefit of causing the air to impinge onto the rotor vanes on the leeward side of the turbine, at an angle which imparts a driving force in the desired direction of rotor travel. In the main, this is achieved by positioning the slats of the inner guide at varying angles around its circumference, in dependence on the desired direction the airflow is to travel in at various zones within the turbine. Thus air within the central space can be, depending on which zone it is located at, selectively guided towards and through the vanes of the rotor, or else be screened away.

Figure 5:
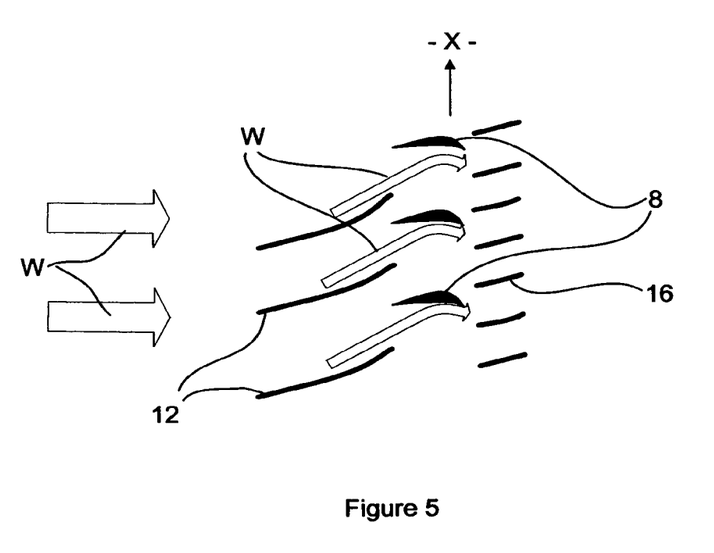
FIG. 5 depicts in detail the operation of the wind turbine in the intake zone according to an embodiment.

All the air initially entering into the intake zone within the central space, is directed in a clockwise direction towards the first boundary zone as indicated by the arrows "W." The slats of the inner guide in the intake zone "A" are angled substantially in the same direction as the slats of the outer guide, in an open position, as can be seen from the detailed depiction of interaction between the slats of the two guide assemblies and the rotor vane in FIG. 5. The airflow (W) is guided from outside the turbine through the gaps between the outer guide slats (12) to impinge onto the rotor vanes (8) at a desired angle. Instead of being allowed to enter the central space in an uncontrolled manner to find its own way around and eventually out of the turbine, the airflow passing through the rotor assembly is directed to the first boundary zone B by the slats of the inner stator assembly.

Figure 6A:
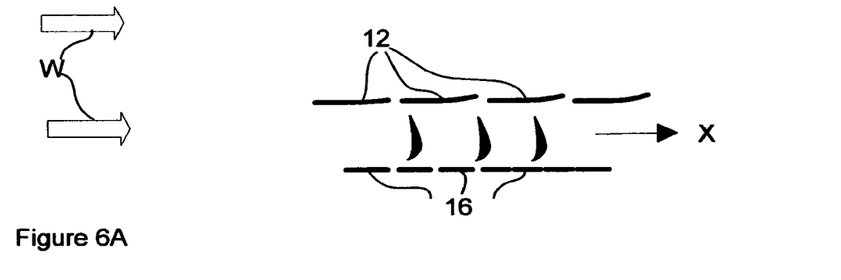
FIGS. 6A and 6B depict in detail the operation of the wind turbine in the boundary zones according to an embodiment.

As can be seen in FIGS. 4 and 6A, the slats of both the inner and outer guide assemblies at the first boundary zone "B" are closed or almost closed so that little or no air can flow out of the central space to the rotor vanes. Screening off this section reduces the impact of back forces on the vanes interrupting the continued smooth movement of the rotor. The orientation of the slats in this region further serves to encourage the flow to change direction and move on to the next zone which is the exhaust zone "C," located on the leeward side of the turbine.

Figure 7:
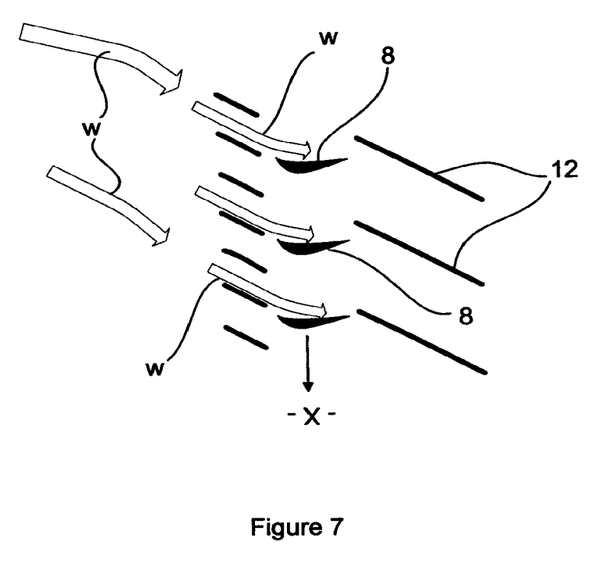
FIG. 7 depicts in detail the operation of the wind turbine in the exhaust zone according to an embodiment.

In the air exhaust zone "C" shown in FIGS. 4 and 7, the slats of both the inner and outer guide assemblies are open and oriented towards the second boundary zone "D," which encourages the air to flow in the same direction as the direction of rotor vane travel. The airflow velocity which would have decreased after entry into the turbine, picks up again especially in this zone by the suction effects of the low pressure area lying outside the turbine on its leeward side (at about the 3 o'clock position) to flow to and out of the turbine via the exhaust zone. The slats of the inner guide in this zone are specifically pitched at angles to encourage the exiting air to contact the leading edge of the rotor vane at a desired angle of attack to impart a pushing force on the vanes in the exhaust zone. This advantageously uses the exhausting air which otherwise would have exerted a back pressure against the direction of rotor travel, to good effect as a second source of positive pushing force on the rotor vanes on the leeward side of the turbine.

Figure 6B:
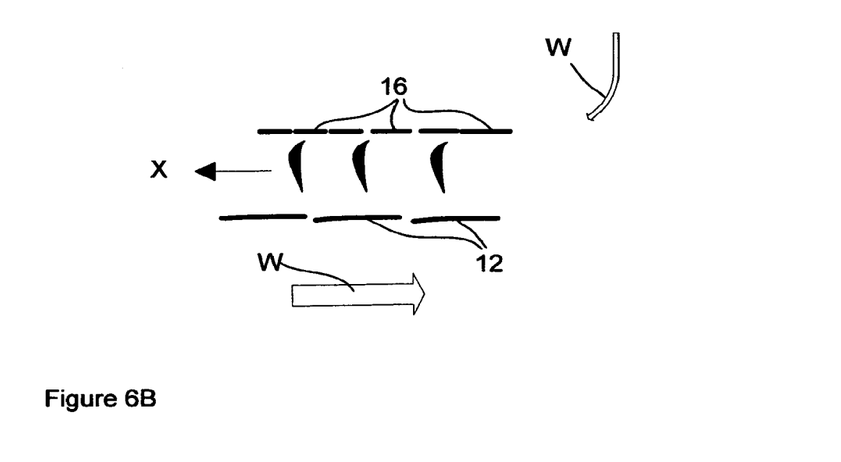

It may be anticipated that much of the air flow entering the central space would leave the chamber from the exhaust zone "C." What air is left continues to circulate around the central axis of the turbine in the direction "X" through the second boundary zone "D" where the slats of both guide assemblies are configured to prevent or discourage the air from exiting the central space. The slat configuration of the guide assemblies is similar to that deployed in the first boundary zone, as depicted in detail in FIG. 6B. FIG. 4 shows an arrangement in which that those inner guide slats in the region closer to the exhaust zone are in a substantially closed position. The slats nearer to the intake zone are in a more open position in that they are angled to allow a fresh airflow travelling from left to right from outside the turbine to enter into the intake zone, while being angled against the circulating airflow within the central space which is travelling in the opposite direction, from right to left, or counter-clockwise. This encourages the airflow within the central space to change direction so that it re-enters the intake zone to be mingled with a new airflow which will go through the cycle within the central space in the manner described above.

In summary, the guide assemblies (10, 14) are configured to cause or to encourage an airflow to:
  impinge onto the rotor at a desired angle of attack in the region of intake zone,
  change direction in the first boundary zone so as to reduce drag by not exiting the turbine at this area,
  impinge onto the rotor at a desired angle of attack in the region of the exhaust zone, and
  change direction in the second boundary zone so as to reduce drag by not exiting the turbine at this area.

As noted above, the greatest advantage can be obtained with the operation of the inner and outer guide assemblies in conjunction with each other. It is however possible to get some of the advantages, chiefly in the form of reduced drag within the turbine, by using one of the assemblies to a greater extent than the other. For example, use of the inner guide assembly (configured in the manner described above) alone could have such an effect. Alternatively, an outer guide assembly having all its slats identically angled (i.e. having not screened sections) used with an inner stator may also be also serve to achieve a reduction in drag. Another alternative is the deployment of an inner guide assembly with movable slats which will help ameliorate the turbulence within the central space.

Figure 8A:
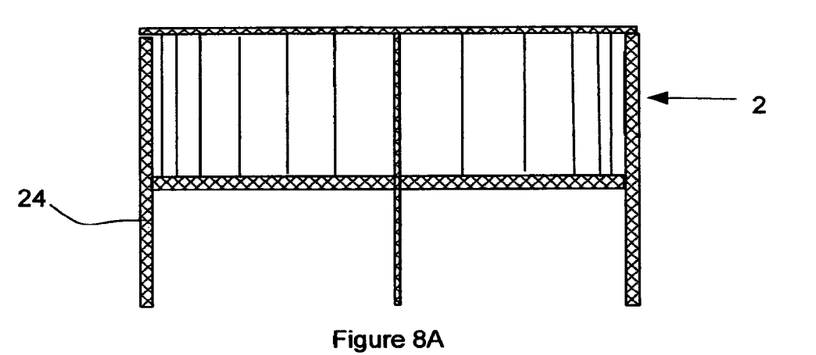
FIGS. 8A and 8B are schematic views of single and arrayed implementations of the wind turbine according to embodiments.
Figure 8B:
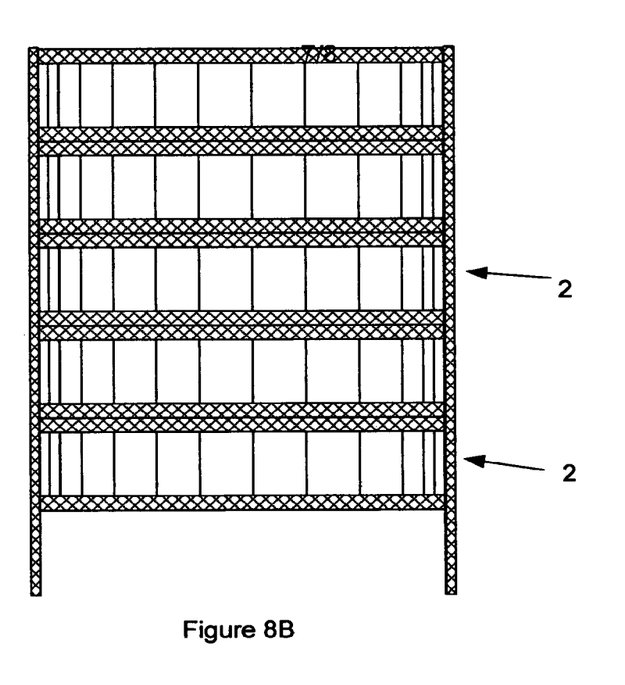

As shown FIG. 2 above, the turbine can be housed in a framework such as a space frame which is a single independent unit. FIG. 8A is another depiction of such a unit, and FIG. 8B shows an implementation of the turbine comprising an array of similar turbines which may be stacked or arrayed one on top of each other. Where it is intended that a number of turbines be deployed, the framework (particularly the columns) can be made from steel in embodiments so that additional units can be added as needed in a modular fashion.

It would be realized that the turbine is not restricted to use only with wind or airflows. The description herein is capable of operation with any fluid flow (including liquids such as sea or river water), with necessary modifications which remain within the scope of the inventive concept.

Other modifications and additions could be made to the turbine unit to improve its usability, such as fittings for a mesh to protect the slats and vanes from intruders (human and animal), walk-around platforms for cleaning and maintenance purposes, and the like.

The invention claimed is:

1. A wind turbine comprising:
  a framework including an annular upper guide means and an annular base guide means;
  an annular rotor assembly surrounding a central space, the rotor assembly comprising a plurality of rotor vanes, each rotor vane being held in position between the upper guide means and the base guide means; and
  a screening for guiding a flow of fluid to circulate substantially within the central space in the same direction as the rotor assembly during use.

2. A wind turbine according to claim 1, wherein the at least one of the upper guide means or the base guide means comprises guide rails.

3. A wind turbine according to claim 1, further comprising covers sandwiching the central space.

4. A wind turbine according to claim 1, wherein each rotor vane is fixed in position relative to each other within the rotor assembly.

5. A wind turbine according to claim 1, wherein each rotor vane is constructed with a foam core and an epoxy composite matrix outer covering.

6. A wind turbine according to claim 1, further comprising a synchroniser to synchronise rotational speeds of both ends of each rotor vane.

7. A wind turbine according to claim 1, wherein the screening is arranged, in use, to:
  guide the flow of fluid out of the central space;
  discourage the flow of fluid from leaving the central space to impinge on the rotor assembly at a fluid retention zone within the central space; and
  encourage the flow of fluid to impinge upon the rotor assembly at a fluid exhaust zone as the flow fluid leaves the central space.

8. A wind turbine according to claim 1, wherein the screening comprises an inner guide array concentrically surrounded by the rotor assembly.

9. A wind turbine according to claim 1, wherein the screening further comprises an outer guide vane concentrically surrounding the rotor assembly.

10. A wind turbine according to claim 8, wherein the inner guide array comprises an assembly of a plurality of slats arranged so that:
  some of the plurality of the louvered slats of the inner guide array are shuttered to discourage the flow from leaving the central space at the fluid retention zone during use; and
  some of other of the plurality of the louvered slats of the inner guide array are angled to encourage the flow leaving the central space at the fluid exhaust zone.

11. A wind turbine according to claim 9, wherein the outer guide array comprises an assembly of a plurality of slats arranged so that:
   some of the plurality of the louvered slats of the outer guide array are shuttered to discourage the flow from leaving the central space via the rotor assembly at the fluid retention zone; and
   some of other of the plurality of the louvered slats of the outer guide array are angled to encourage the flow to impinge upon the rotor assembly at the fluid intake zone.

12. A wind turbine according to claim 10, wherein the angle of each of the plurality of slats of the inner guide array can be changed.

13. A wind turbine according to claim 11, wherein the angle of each of the plurality of slats of the outer guide array can be changed.

14. A wind turbine system according to claim 1, further comprising a generator.

15. A method of guiding a flow of a fluid using a wind turbine according to claim 1, comprising:
   guiding the flow of fluid to travel in a substantially circular direction within the central space, from a fluid intake zone, to a first fluid retention zone, to a fluid exhaust zone, to a second fluid retention zone, and back to the fluid intake zone, wherein
   the fluid is discouraged from leaving the central space at the first fluid retention zone,
   all or part of the fluid leaves the central space at the fluid exhaust zone,
   any remaining fluid is discouraged from leaving the central space at the second fluid retention zone, and
   the any remaining fluid is returned to the fluid intake zone.

16. A wind turbine according to claim 1, wherein each rotor vane is held in position between the upper guide means and the base guide means by fixing each rotor vane at each end to plates.

* * * * *